(12) United States Patent
Sonnek

(10) Patent No.: US 9,342,343 B2
(45) Date of Patent: May 17, 2016

(54) WRAPPED NESTED VIRTUALIZATION

(71) Applicant: Adventium Enterprises, LLC, Minneapolis, MN (US)

(72) Inventor: Jason D. Sonnek, Lino Lakes, MN (US)

(73) Assignee: Adventium Enterprises, LLC, Minneapolis, MN (US)

( * ) Notice: Subject to any disclaimer, the term of this patent is extended or adjusted under 35 U.S.C. 154(b) by 66 days.

(21) Appl. No.: 14/206,036

(22) Filed: Mar. 12, 2014

(65) Prior Publication Data

US 2014/0282539 A1 Sep. 18, 2014

Related U.S. Application Data

(60) Provisional application No. 61/798,319, filed on Mar. 15, 2013.

(51) Int. Cl.
*G06F 9/455* (2006.01)
(52) U.S. Cl.
CPC .. *G06F 9/45558* (2013.01); *G06F 2009/45566* (2013.01)
(58) Field of Classification Search
None
See application file for complete search history.

(56) References Cited

U.S. PATENT DOCUMENTS

| | | | |
|---|---|---|---|
| 8,286,174 B1* | 10/2012 | Schmidt et al. | 718/104 |
| 8,886,571 B2* | 11/2014 | Mannava et al. | 705/400 |
| 2006/0085792 A1* | 4/2006 | Traut | G06F 11/1438 718/100 |
| 2007/0050764 A1* | 3/2007 | Traut | 718/1 |
| 2008/0034365 A1* | 2/2008 | Dahlstedt | 718/1 |
| 2009/0007103 A1* | 1/2009 | Bennett et al. | 718/1 |
| 2009/0113110 A1* | 4/2009 | Chen et al. | 711/6 |
| 2009/0193399 A1* | 7/2009 | Mitran et al. | 717/139 |
| 2009/0271786 A1* | 10/2009 | Groth | 718/1 |
| 2010/0169882 A1* | 7/2010 | Ben-Yehuda et al. | 718/1 |
| 2010/0325454 A1* | 12/2010 | Parthasarathy | G06F 1/3203 713/320 |
| 2011/0047547 A1* | 2/2011 | Bennett et al. | 718/1 |
| 2011/0072428 A1* | 3/2011 | Day et al. | 718/1 |
| 2011/0153909 A1* | 6/2011 | Dong | 711/6 |
| 2012/0131571 A1* | 5/2012 | Ben-Yehuda et al. | 718/1 |
| 2012/0131574 A1* | 5/2012 | Day et al. | 718/1 |
| 2012/0216187 A1* | 8/2012 | Ben-Yehuda et al. | 718/1 |
| 2012/0317569 A1* | 12/2012 | Payne et al. | 718/1 |
| 2013/0139159 A1* | 5/2013 | Eidus et al. | 718/1 |
| 2013/0232486 A1* | 9/2013 | Chen et al. | 718/1 |

(Continued)

OTHER PUBLICATIONS

Azab, et al., HyperSentry: Enabling Stealthy In-context Measurement of Hypervisor Integrity, Retrieved from discovery.csc.ncsu.edu/pubs/ccs10.pdf, In Proceedings of the 17th ACM Conference on Computer and Communications Security, Oct. 4-8, 2010, Chicago, Illinois, USA, 12 pages.

(Continued)

*Primary Examiner* — Emerson Puente
*Assistant Examiner* — Mehran Kamran
(74) *Attorney, Agent, or Firm* — Brooks, Cameron & Huebsch, PLLC

(57) ABSTRACT

A number of embodiments can include a Layer 0(L0) VMM configured to provide a first number of services and a Layer 1(L1) virtual machine (VM) that is running on the L0 VMM. A number of embodiments can also include a L1 VMM that is running on the L1 VM. A number of embodiments can include configuring the L1 VMM to provide a second number of services to a target VM, second number of services being different than the first number of services. A number of embodiments can also include configuring the target VM to execute a user application.

5 Claims, 4 Drawing Sheets

(56) References Cited

U.S. PATENT DOCUMENTS

| | | | |
|---|---|---|---|
| 2013/0238786 A1* | 9/2013 | Khesin | 709/224 |
| 2013/0263118 A1* | 10/2013 | Kannan et al. | 718/1 |
| 2013/0297849 A1* | 11/2013 | Wagner | 711/6 |
| 2014/0096131 A1* | 4/2014 | Sonnek et al. | 718/1 |
| 2014/0229943 A1* | 8/2014 | Tian et al. | 718/1 |
| 2014/0250437 A1* | 9/2014 | Ginzton et al. | 718/1 |

OTHER PUBLICATIONS

Ben-Yehuda, et al., "The Turtles Project: Design and Implementation of Nested Virtualization", Retrieved from www.usenix.org/legacy/event/osdi10/tech/full_papers/Ben-Yehuda.pdf, In Proceedings of the 9th USENIX conference on Operating Systems Design and Implementation, OSDI'10, Berkeley, CA, USA, Oct. 4-6, 2010, 14 pages.

Citrix Systems, Inc., "The Split Driver Model", Retrieved from my.safaribooksonline.com/book/operating-systems-and-server-administration/virtualization/9780132349710/understanding-device-drivers/ch06lev1sec1, Accessed on May 9, 2014, 2 pages.

Citrix Systems, Inc., "XenClient XT", Retrieved from www.citrix.com/products/xenclient/features/editions/xt.html., Accessed on Jan. 15, 2013, 3 pages.

Clark, et al., "Live Migration of Virtual Machines", In Proceedings of the 2nd Conference on Symposium on Networked Systems Design and Implementation, Berkeley, CA, USA, May 2-4, 2005, USENIX Association, 16 pages.

Colp, et al., "Breaking Up is Hard to Do: Security and Functionality in a Commodity Hypervisor", In Proceedings of the 23rd ACM Symposium on Operating Systems Principles, SOSP '11, Oct. 23-26, 2011, Cascais, Portugal, 14 pages.

Deshpande, et al., "Live Gang Migration of Virtual Machines", In Proceedings of the 20th International Symposium on High Performance Distributed Computing, HPDC '11, Jun. 8-11, 2011, San Jose, CA, USA, 12 pages.

Unknown., "Distributed Management Task Force, Inc.", Retrieved from www.dmtf.org/standards/ovf, Accessed on Jan. 15, 2013, 3 pages.

Garfinkel, et al., "A Virtual Machine Introspection Based Architecture for Intrusion Detection", In Proceedings of Network and Distributed Systems Security Symposium, NDSS 2003, Feb. 6-7, 2003, San Diego, CA, USA, 16 pages.

He, Qing., "Nested Virtualization on Xen", Retrieved from www-archive.xenproject.org/files/xensummit_intel09/xensummit-nested-virt.pdf, Xen Summit Asia, Nov. 2009, 13 pages.

Kortchinsky, Kostya., "Cloudburst: A VMware Guest to Host Escape Story", Retrieved from www.blackhat.com/presentations/bh-usa-09/KORTCHINSKY/BHUSA09-Kortchinsky-Cloudburst-SLIDES.pdf, BlackHat USA, Jun. 2009, Las Vegas, 48 pages.

Mattson, J., "Running Nested VMs", Retrieved from https://communities.vmware.com/docs/DOC-8970, VMware Communities, Nov. 2008, 32 pages.

McDermott, et al., "An Open-Source High-Robustness Virtual Machine Monitor", Retrieved from www.acsac.org/2006/wip/ACSAC-WiP06-06-McDermott-WIP0.pdf, Dec. 2006, 3 pages.

Nguyen, et al., "MAVMM: Lightweight and Purpose Built VMM for Malware Analysis", In Computer Security Applications Conference, ACSAC'09, Dec. 7-11, 2009, Honolulu, Hawaii, USA, 10 pages.

Pfoh, et al., "A Formal Model for Virtual Machine Introspection", In Proceedings of the 1st ACM workshop on Virtual machine security, Nov. 9-13, 2009, Chicago, IL, USA, 9 pages.

Rackspace, Inc., "Rackspace: The open cloud company", Retrieved from www.rackspace.com/, Accessed on Jan. 15, 2013, 2 pages.

Ristenpart, et al., "Hey, You, Get Off of My Cloud: Exploring Information Leakage in Third-Party Compute Clouds", In Proceedings of the 16th ACM conference on Computer and Communications Security, CCS '09, Nov. 9-13, 2009, Chicago, IL, USA, 14 pages.

Sonnek, et al., "Virtual Putty: Reshaping the Physical Footprint of Virtual Machines", In Proceedings of Workshop on Hot Topics in Cloud Computing (HotCloud09), Jun. 15, 2009, San Diego, CA, USA, 5 pages.

Sonnek, et al., "Starling: Minimizing Communication Overhead in Virtualized Computing Platforms Using Decentralized Affinity-Aware Migration", Published Dec. 2, 2009, In 39th International Conference on Parallel Processing (ICPP), Sep. 13-16, 2010, 14 pages.

Varia, et al., "Overview of Amazon Web Services", Retrieved from media.amazonwebservices.com/AWS_Overview.pdf, Mar. 2013, 22 pages.

VMware Inc., "VMware vCenter Converter", Retrieved from www.vmware.com/products/converter, Accessed on Jan. 15, 2013, 4 pages.

VMware Inc., "VMware vCloud Powered Services", Retrieved from www.vmware.com/cloud-computing/public-cloud/vcloud-powered-services/, Accessed on Jan. 15, 2013, 4 pages.

Wang, et al., "HyperSafe: A Lightweight Approach to Provide Lifetime Hypervisor Control-Flow Integrity", In 2010 IEEE Symposium on Security and Privacy, May 16-19, 2010, Oakland, CA, USA, 16 pages.

Wojtczuk, et al., "Following the White Rabbit: Software attacks against Intel VT-d technology", Retrieved from www.invisiblethingslab.com/resources/2011/Software%20Attacks%20on%20Intel%20VT-d.pdf, Apr. 2011, 27 pages.

xen.org., "Xen Hypervisor", Retrieved from www.xenproject.org/developers/teams/hypervisor.html, Accessed on May 9, 2014, 4 pages.

Zhang, et al., "CloudVisor: Retrofitting Protection of Virtual Machines in Multi-tenant Cloud with Nested Virtualization", Proceedings of the 23rd ACM Symposium on Operating Systems Principles, SOSP '11, Oct. 23-26, 2011, Cascais, Portugal, 14 pages.

Zhang, et al., "Nested Virtualization Update from Intel", Retrieved from http://www.slideshare.net/xen_com_mgr/nested-virtualization-update-from-intel, Aug. 27-28, 2012, San Diego, CA, USA, 28 pages.

Zhang, et al., "Cross-VM Side Channels and Their Use to Extract Private Keys", Proceedings of the 2012 ACM Conference on Computer and Communications Security, CCS '12, Oct. 16-18, 2012, Raleigh, North Carolina, USA, 12 pages.

* cited by examiner

WRAPPED NESTED VIRTUALIZATION

PRIORITY INFORMATION

This application claims priority to U.S. Provisional Application Ser. No. 61/798,319, filed Mar. 15, 2013.

GOVERNMENT RIGHTS

The subject matter of this disclosure was made with government support under Agreement FA8750-10-D-0197 awarded by the Air Force. Accordingly, the U.S. Government has certain rights in this invention.

BACKGROUND

A virtual machine (VM) can require a number of services. For example, a VM can require security services, power management services, resource management services, and/or back-up services. Security services can prevent malware which can harm computational operations and can gain access to sensitive information that can be used to harm a user, for instance. Malware can reproduce itself and can spread from one computer system to a number of other computer systems (e.g., within a cloud system). Computer systems can become infected by malware, which may be installed knowingly or unknowingly by a user.

DETAILED DESCRIPTION

Figure 1:
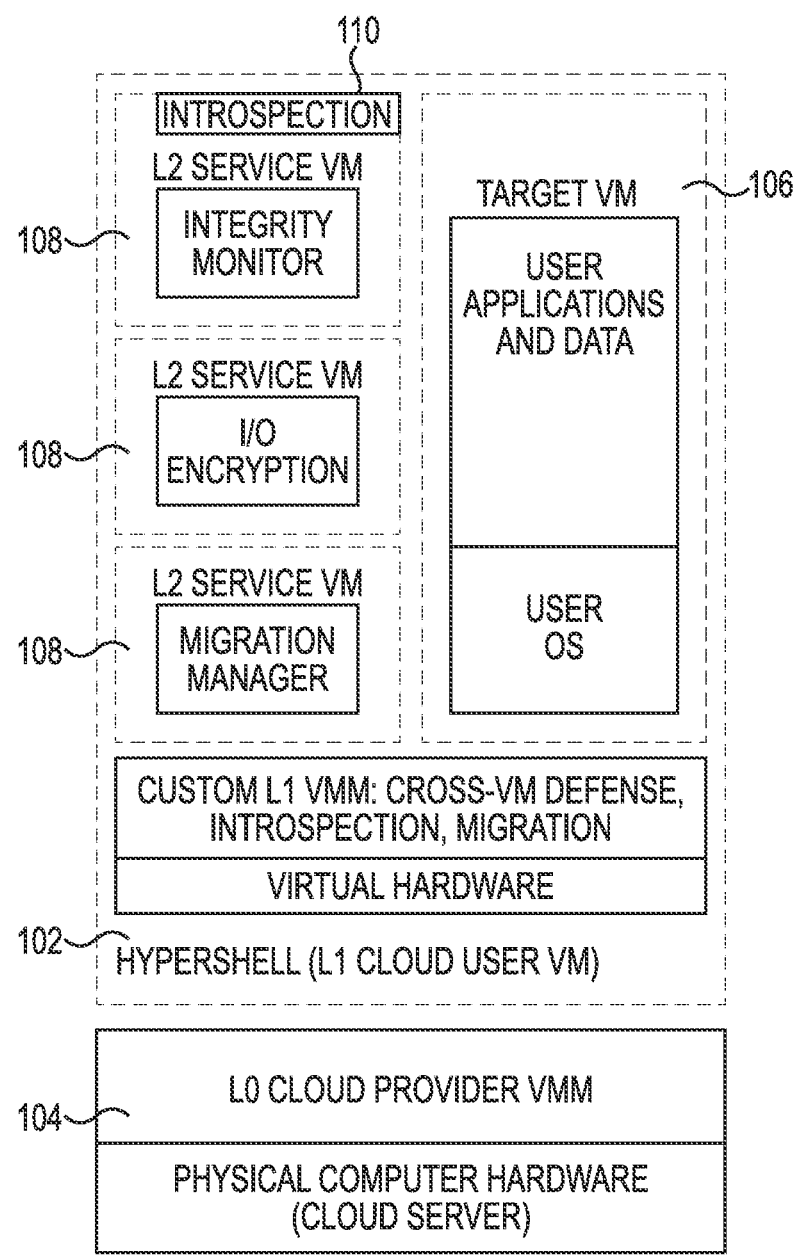
FIG. 1 illustrates a system for wrapped nested virtualization in accordance with a number of embodiments of the present disclosure.

Virtual machine (VM) based services can combine aspects of perimeter and Operating System (OS) based (i.e., host based) services. Like perimeter services, VM based services can be isolated from malware that compromises vulnerable Internet-facing software services or the OS that hosts them, increasing confidence in the integrity of the services. Like OS based services, VM based services can enjoy a complete and unfiltered view of the target VM state (e.g., OS and application). By leveraging these strengths, VM based services can provide trustworthy, proactive, and/or context based defense. For example, VM based defenses can provide near real-time situational awareness for sensitive applications running in the cloud.

As used herein, services can include back-up services, migration services, power management services, resource management services, services that defend against malware, services against malicious insiders, and/or services against user error, among other types of services that can be offered. The examples shown herein are given in the context of defensive services. However, the examples shown herein are illustrative and not limiting. For instance, a number of embodiments of the disclosure can also be used in the context of other types of services.

In a number of examples, the availability and capabilities of VM based services can be dependent on the underlying virtual machine monitor (e.g., hypervisor) used by the cloud platform. If a VMM does not, for instance, support VM introspection or VM migration, then services developed for the platform may only be able to provide limited runtime integrity monitoring or moving target defense, respectively. VM based services can be limited by commercial cloud infrastructures.

According to the present disclosure, cloud users can select, deploy and control their own services, regardless of the services that are provided by the cloud infrastructure. Moreover, in a number of embodiments, a layer of virtualization based software services, which may be referred to as HyperShell, can also provide the number of services via wrapped nested virtualization. As used herein, wrapped nested virtualization can include running a hypervisor in a guest virtual machine hosted on another hypervisor. For example, HyperShell can contain a portable layer of services that provides transparent security services for a target VM, also contained in HyperShell. HyperShell and its contents can run in a cloud platform that can be based on various hypervisors (e.g., Xen, VMware, KVM, Hyper-V, etc.). HyperShell can follow the target VM as it migrates between cloud platforms.

HyperShell can provide a general and transparent layer of software services that can be deployed in the near-term on commodity cloud infrastructure. A transparent layer of software services provided by HyperShell can include a HyperShell VM, a number of service VMs, and a number of target VMs that are running on a HyperShell hypervisor. As used herein, transparency refers to providing a service without a user having knowledge of the service and/or the user's experience being affected by the service. For example, a transparent layer of software defense can refer to a layer of software defense of which an end user may not be aware. HyperShell can enable a user to deploy applications in the cloud that require high security and/or trustworthy auditing. HyperShell can provide freedom to select a cloud provider on the basis of cost rather than being constrained by the features provided by the underlying hypervisor of a cloud provider. HyperShell is portable and can support cross-cloud migration which can provide a user with a number of services such as a moving target defense to react to attacks. HyperShell can provide cloud-level diversity for security, fault-tolerance, and cloud bursting to handle demand spikes or Denial of Service (DoS) attacks.

FIG. 1 illustrates a system for wrapped nested virtualization in accordance with a number of embodiments of the present disclosure. FIG. 1 includes a cloud platform 104, a HyperShell VM 102, a number of service VMs 108, and a target VM 106.

FIG. 1 illustrates an implementation of HyperShell VM 102 in accordance with a number of embodiments of the present disclosure. The example shown in FIG. 1 depicts a layer of virtualization (e.g., HyperShell VM 102) that exists between the cloud platform 104 and the target VM 106 and/or the number of service VMs 108. The cloud platform 104 can include the physical hardware and "Layer 0" (L0) VMM (e.g., hypervisor). Although hypervisors are one type of VMM, the terms VMM and hypervisor are used interchangeably herein.

As used herein, a layer refers to a nested layer in a virtualized environment. For example, L0 refers to a base layer. "Layer 1" (L1) refers to an intermediate layer that is nested within the base layer (e.g., L0). "Layer 2" (L2) refers to an upper that is nested within the intermediate layer (e.g., L1).

In a number of examples, the target VMs 106 can access consistent interfaces and hypervisor services, regardless of which cloud platform they are deployed on, by decoupling the platform-specific resource management services provided by the Layer 0 hypervisor from the platform-agnostic security services provided by the Layer 1 hypervisor. A uniform Application Programming Interface (API) (e.g., hypervisor user interface) can enable construction and deployment of a customizable shell of service VMs 108 (e.g., additional Layer 2 VMs) that can provide services to cloud user applications and data (i.e., target VM 106) when they are running on any third-party cloud platform. In a number of examples, service VMs 108 are referred to as defending VMs in a security context. For example, service VMs 108 that provide security services can be referred to as defending VMs.

In a number of examples, defensive capabilities include transparent input/output (I/O) encryption. Transparent I/O encryption can include protecting confidentiality and integrity of cloud user data from untrusted cloud infrastructure (e.g., untrusted networks or data centers) by transparently encrypting all network and storage. Transparent I/O encryption can protect the confidentiality and integrity of data stored or transmitted using cloud infrastructure without requiring any changes to the cloud platform. Transparent I/O encryption can be achieved using cryptographic techniques to transparently encrypt, decrypt, verify, and/or authenticate the I/O traffic processed by the target VM 106. The I/O traffic generated or received by the target VM 106 may be protected from unauthorized interception or modification any time the I/O traffic is not being actively processed by the target VM 106, including when the data is in transit on cloud network infrastructure or stored in cloud storage repositories.

Defensive capabilities can also include OS and application integrity monitoring. Application integrity monitoring can include protecting cloud user processing and data from external malware by using VM integrity verification techniques to ensure the integrity of the operating system (OS) and critical applications within the target VMs 106. VM integrity monitoring can protect the integrity of the target VM 106 from external attacks aimed at implanting malware that compromises the OS or applications running in the target VM 106.

Malware can be identified and neutralized by implementing a VM integrity checker that can detect unexpected changes to selected VM state. A set of archetypal malware behaviors can be identified that can be used to reliably detect attacks on a target VM. The set of archetypal malware behaviors can be selected to demonstrate the generality of this approach, including malware that relies on modifications to runtime CPU, memory, and/or disk state associated with both user processes and the OS kernel. VM integrity monitoring algorithms can reliably detect malware despite dynamic and potentially inconsistent runtime state.

VM based defenses can utilize VM introspection to implement a VM integrity checker that detects and responds to the external attacks. A VM introspection library for Xen based hypervisors can provide complete and trustworthy visibility into VM runtime state. VM introspection 110 capabilities can provide proactive defense against broad classes of attack rather than relying on existing blacklist or signature based reactive techniques. VM introspection 110 capabilities can be integrated with wrapped nested virtualization to build a nested hypervisor that supports proactive defense against broad classes of attacks irrespective of whether it is provided by the cloud platform hypervisor.

A VM introspection library can allow a privileged VM to "look into" a monitored VM. The monitoring VM can request access to the physical resources assigned to the monitored VM (e.g., memory, Central Processing Unit (CPU) registers, and disk blocks, among other physical resources). The introspection library can use its understanding of OS internals to translate this raw data into meaningful OS and application-level state (e.g., list of running processes, loaded drivers, and/or active network connections, among other states). Since this raw state data is acquired directly from the hypervisor, and does not depend on any software running in the monitored VM, malware running in the monitored VM cannot hide by intercepting requests and manipulating the data.

This existing introspection library can be used in association with HyperShell's trustworthy VM integrity monitoring capability. Introspection libraries can be integrated with a Layer 1 hypervisor. Wrapped nested virtualization based defenses can provide real-time, complete, and/or trustworthy access to target VM state, irrespective of whether the underlying cloud platform hypervisor supports VM introspection. Runtime integrity monitoring using wrapped nested virtualization enables broad deployment across heterogeneous cloud platforms.

If, for example, the VM starts in a clean (e.g., known "good") state, then malware needs to make some change to the state of the system to introduce undesirable functionality into the system (e.g., modify existing software and/or add new software). By leveraging the visibility provided by the Layer 1 hypervisor and the introspection library, the wrapped nested virtualization based defense integrity monitoring component can detect any such change by monitoring active processes, including user-mode applications, the OS kernel, and/or kernel modules, and by monitoring the state associated with those components (e.g., data stored in memory, on disk, and/or in CPU registers).

Defensive capabilities include data processing confidentiality. Data processing confidentiality includes protecting the confidentiality of cloud user processing and data from other cloud users by inhibiting cross-VM side channel attacks that rely on timing and shared hardware to snoop on (e.g., obtain information from) co-located VMs.

Figure 2A:
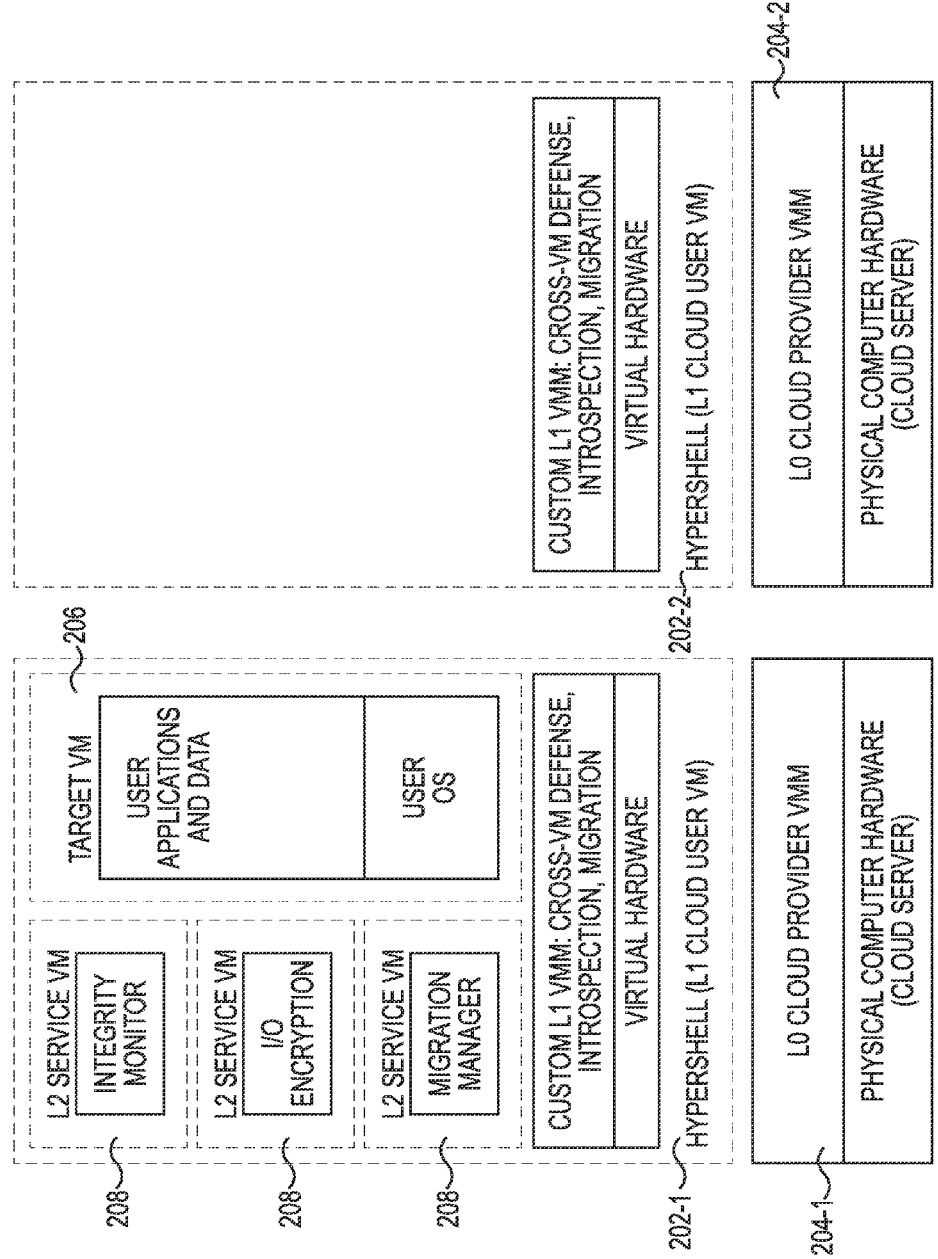
FIG. 2A illustrates a functional block diagram associated with migrating a target VM in accordance with a number of embodiments of the present disclosure.
Figure 2B:
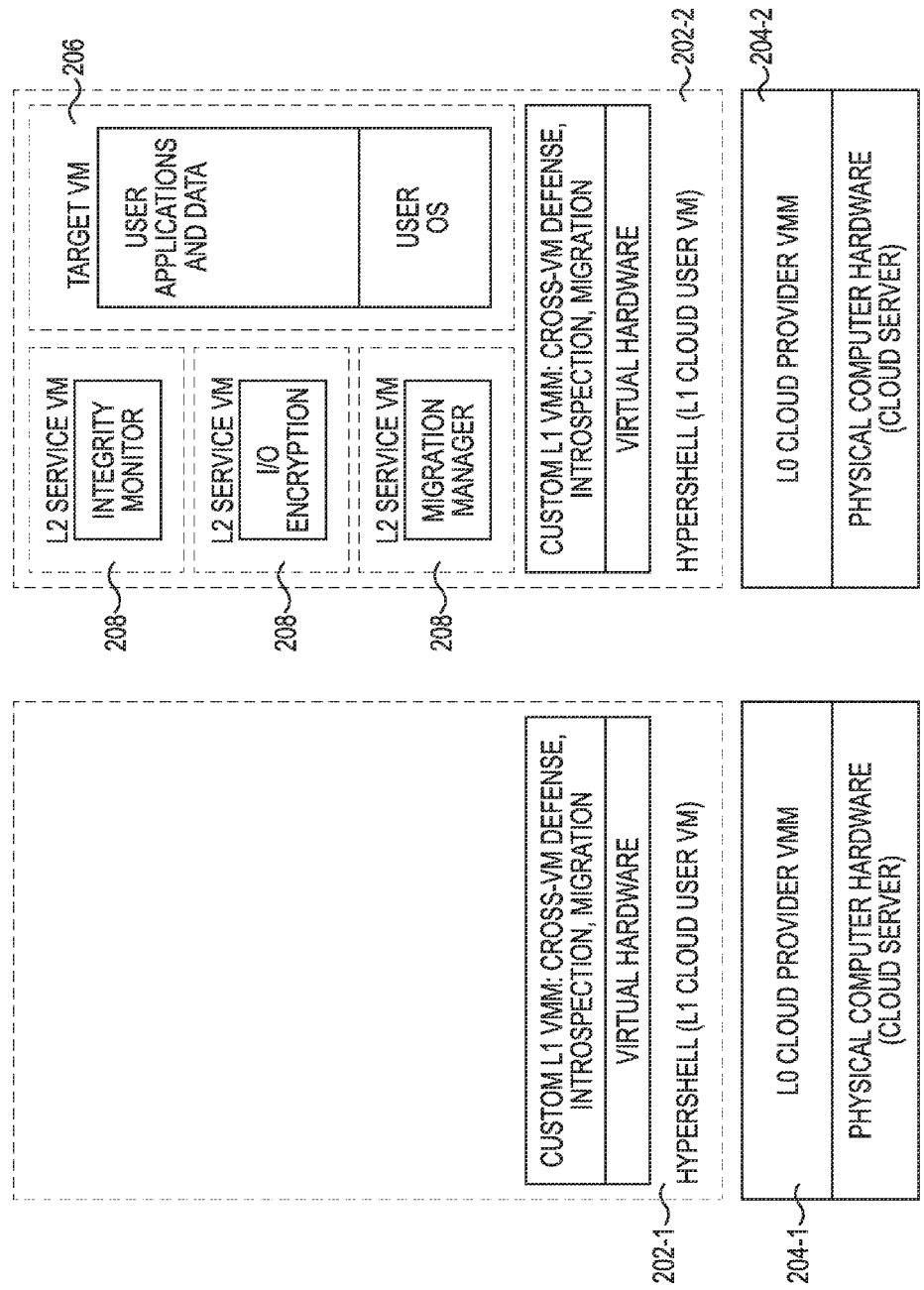
FIG. 2B illustrates a functional block diagram associated with migrating a target VM in accordance with a number of embodiments of the present disclosure.

Defensive capabilities also include moving target defense. Moving target defenses can include protecting target VMs 106 against external attacks by migrating nested VMs between HyperShell VM 102 instances running on different cloud platforms. FIG. 2A and FIG. 2B provide an example of migrating nested VMs between HyperShell VM 102 instances.

Due to differences in hypervisor services, APIs, and VM format used by commercial off-the-shelf (COTS) hypervisors, migrating a VM from one cloud platform to another can be an onerous manual process. Using wrapped nested virtualization, it is possible to move a nested VM between heterogeneous commodity cloud platforms, with effectively zero downtime (live migration), regardless of the interfaces or features supported by the cloud platform hypervisor. For example, a target Layer 2 VM can be dynamically relocated from one cloud platform to another.

In a number of examples, the relocation can be a coordinated migration of groups of VMs, or gang migration. Coordinated migration can include moving a number of VMs together while maintaining dependencies among the VMs. For example, if a first VM depends on a second VM and a third VM, then moving the first VM, the second VM, and the third VM from a first platform to a second platform can include moving the second VM and the third VM in parallel before moving the first VM. A coordinated migration of groups of VMs can provide a means for transparent, synchronized migration of a set of target VMs and their associated VM based defenses with no disruption in security, enabling moving target defense and cloud diversity among other users.

For example, if a target VM consumes a number of services provided by a number of service VMs, then the target VM and the service VMs can be moved together to a cloud platform rather than moving the target VM and relying on a number of different service VMs to provide the number of services previously provided by the number of service VMs. Coordinated migration of VMs can allow a user to customize a number of services provided by the service VMs and maintain the customization of the number of services regardless of the movement of the service VMs and the target VMs.

HyperShell can enable migration (e.g., coordinated and live) of nested VMs between heterogeneous cloud platforms irrespective of whether the underlying cloud platform supports VM migration. The HyperShell can simultaneously deploy Layer 1 HyperShell VM containers on heterogeneous cloud platforms. A nested VM running in a HyperShell container on one cloud can be independently migrated from one of the experimental cloud platforms to the other.

Defensive capabilities also include real-time situational awareness. Real-time situational awareness includes VM monitoring and auditing by providing the tools necessary to provide a number of services to the target VM 108. Wrapped nested virtualization based defenses, such as those described herein, can provide continuous run-time integrity attestation of the cloud user VM, as well as real-time situational awareness, irrespective of the underlying cloud platform.

In a public cloud environment, other cloud users sharing the same physical infrastructure are a significant threat. A malicious VM can arrange to be placed on the same physical hardware as a target VM and exploit shared hardware (e.g., processor caches) to interfere with or observe (e.g., snoop) on target VM applications and extract credentials (e.g., passwords and crypto keys) from the target VM. In a number of examples, defenses can be provided against such an attack due to the extra layer of abstraction introduced by wrapped nested virtualization. Introducing noise in various Layer 1 hypervisor subsystems, such as the VM scheduler, can make it extremely difficult for a malicious Layer 1 VM to spy on a nested VM running within a HyperShell.

The HyperShell layer has the potential to provide effective defense against several classes of cross-VM attacks regardless of whether the Layer 0 cloud platform hypervisor provides any such protection. Noise can be introduced in a Layer 1 hypervisor subsystem (e.g., VM scheduling and/or memory management) that can inhibit side-channel attacks that depend on timing and knowledge of the mapping between virtual and physical resources.

One of the advantages of HyperShell's wrapped nested virtualization approach is that the HyperShell VM 102 layer can be dynamically interposed between existing operational VMs and the underlying commodity cloud platform 104 without affecting the behavior of the layers above or the layers below. A VM encapsulator can provide backwards compatibility by transparently "wrapping" HyperShell defenses around an existing VM.

Wrapped nested virtualization based defenses can include a customizable Layer 1 (e.g., nested) hypervisor that supports VM introspection and/or VM migration. Wrapped nested virtualization based defenses can support a broad range of COTS guest OSes in the target VM 108 and a Layer 2 I/O encryption component that protect the target VM 108 from untrusted cloud infrastructure. Wrapped nested virtualization based defenses can also include a Layer 2 VM integrity component that protects the integrity of the target VM 108 from external attacks, enhancements to the Layer 1 hypervisor that protect the target VM 108 from other cloud users by inhibiting cross VM attacks, and/or a cloud test facility, running commodity Layer 0 hypervisors with support for wrapped nested virtualization, that can be used for HyperShell prototype development and evaluation.

Wrapped nested virtualization based defenses can be based on a customizable nested (e.g., Layer 1) hypervisor. The wrapped nested virtualization layer (e.g., customizable nested hypervisor) can provide features to support effective defense while minimizing the attack surface by limiting the hypervisor's responsibilities.

A wrapped nested virtualization based defense can be based on an unmodified hypervisor (e.g., unmodified open-source Xen hypervisor, among other hypervisors) as a Layer 1 hypervisor. The hypervisor can be a feature-rich, enterprise-ready, highly-adaptable hypervisor that meets all the requirements needed for wrapped nested virtualization based defense system. A hypervisor can be utilized in Infrastructure as a Service (IaaS) cloud systems, for instance.

A hypervisor can be adapted as needed to enable proper operation as a nested (e.g., Layer 1) hypervisor. A hypervisor can also be adapted to support the defensive capabilities proposed herein. A hypervisor can be adapted to improve performance and reduce the attack surface of the nested hypervisor by reducing the functionality provided by the nested hypervisor. For example, a nested hypervisor does not need to perform physical resource management, so a privileged management domain that supports a broad class of physical device drivers is unnecessary. This "hardening" of the nested hypervisor can provide higher assurance that the target VMs or VM based defenses cannot be compromised by Layer 2 VM escape attacks or attacks on the nested hypervisor.

In a number of examples, a HyperShell existing on VMs can be installed without extensive porting or specialist support, providing backwards compatibility and facilitating transition to operational environments. VM binary image format standards such as Open Virtualization Format (OVF) and utilities for automated translation can be incorporated between different VM formats into the design described herein. In a number of examples, a HyperShell can be installed where a non-nested virtualization layer previously existed. The virtual machine, OS, and/or applications can be wrapped by the HyperShell without affecting the function and/or the state of the virtual machine, OS, and/or applications that are wrapped.

Codepacks can be hardened versions of existing host-based defenses, or they can be custom defenses tailored to address the current threat environment. Codepacks can be implemented using the defending VMs. A codepack can be a service module that provides a number of services to the target VM by accessing the number of virtual resources from the defending VMs. The hypervisor introspection capability will provide software defenses running in isolated VMs with the ability to monitor and manipulate software abstractions, such as processes, files, and/or network connections, running in untrusted target VMs without requiring any support from software running in the untrusted VMs. The hypervisor introspection capability cannot be spoofed by malicious software running in defended guest OSs or applications running on these OSs. The HyperShell VM integrity component will build on the introspection capabilities.

A virtual cyber defender (VCD) can be overlaid on a service oriented architecture (SOA) architecture to develop a set of SOA specific defensive codepacks for the VCD. An example of a VCD is described in U.S. patent application Ser.

No. 13/631,122, which is herein incorporated by reference in its entirety. The overlay can provide host layer defenses that are coordinated with existing defenses at the SOA layer. The codepacks can provide network access control coordinated with SOA services, extended web services security, and/or introspection features that detect corruption of key configuration information as well as anomalous server behavior. The result can include protection against some of the unique threats introduced by the SOA brokered services model and improved protection against threats common to SOA and cloud systems.

FIG. 2A, illustrates a functional block diagram associated with migrating a target VM in accordance with a number of embodiments of the present disclosure. FIG. 2A includes a cloud platform 204-1, a cloud platform 204-2, a target VM 202-1, a target VM 202-2, a number of service VMs 208, and a target VM 206.

FIG. 2A illustrates the state of the cloud platform 204-1, the cloud platform 204-2, the HyperShell VM 202-1, the HyperShell VM 202-2, the service VMs 208, and the target VM 206 before a migration of the service VMs 208 and the target VM 206.

Before a migration, the target VM 206 and the number of defending VMs 208 can be nested within the cloud platform 204-1 and HyperShell VM 202-1. The cloud platform 204-1 and/or the HyperShell VM 202-1 can constitute a cloud platform different from than the cloud platform 204-2 and/or the HyperShell VM 202-1. For example, the cloud platform 204-1 can include a first L0 hypervisor that is a different type of hypervisor than a second L0 hypervisor that is included in the cloud platform 204-2. The first L0 hypervisor can offer different security services and/or can provide different functionalities than the second L0 hypervisor.

A migration manager VM from the number of service VMs 208 can trigger the migration of the HyperShell VM 202-1, the service VMs 208, and/or the target VM 206. In a number of examples, the HyperShell VM 202-1 can trigger the migration of the HyperShell VM 202-1, the service VMs 208, and/or the target VM 206.

Moving the number of service VMs 208 and the target VM 206 can occur without disrupting the number of services provided by the number of service VMs 208. A number of services provided by the number of service VMs 208 can be disrupted when the number of services are not provided to the target VM while the target VM is active. For example, an encryption service can be disrupted when a target VM 206 sends a message that is not encrypted by one of the service VMs 208 that offers the encryption service. The migration of the number of service VMs 208 and the target VM 206 can occur in real time without a user of an application running on the target VM 206 becoming aware of the migration.

The migration manager VM can coordinate the migration by preserving the structure associated with the service VMs 208 and the target VM 206. The structure associated with the service VMs 208 and the target VM 206 can include the communication channels between the service VMs 208 and the target VM 206. Preserving the structure associated with the service VMs 208 and the target VM 206 can include maintaining the same structure after the migration that existed before the migration.

FIG. 2B illustrates a functional block diagram associated with migrating a target VM in accordance with a number of embodiments of the present disclosure. FIG. 2B includes a cloud platform 204-1, a cloud platform 204-2, a HyperShell VM 202-1, a HyperShell VM 202-2, a service VMs 208, and a target VM 206 that are analogous to the cloud platform 204-1, the cloud platform 204-2, HyperShell VM 202-1, the HyperShell VM 202-2, the service VMs 208, and the target VM 206 if FIG. 2A.

FIG. 2B illustrates the state of the cloud platform 204-1, the cloud platform 204-2, the HyperShell VM 202-1, the HyperShell VM 202-2, the service VMs 208, and the target VM 206 after a migration of the service VMs 208 and the target VM 206.

After a migration, the target VM 206 and the service VMs 208 can be nested within the cloud platform 204-2 and the HyperShell VM 202-2. The migration can occur regardless of the type of hypervisor that is supported by the cloud platform 204-1 and/or the cloud platform 204-2. The HyperShell VM 202-1 and the HyperShell VM 202-2 can provide the service VMs 208 the compatibility to function nested within the cloud platform 204-1 and/or the cloud platform 204-2.

Figure 3:
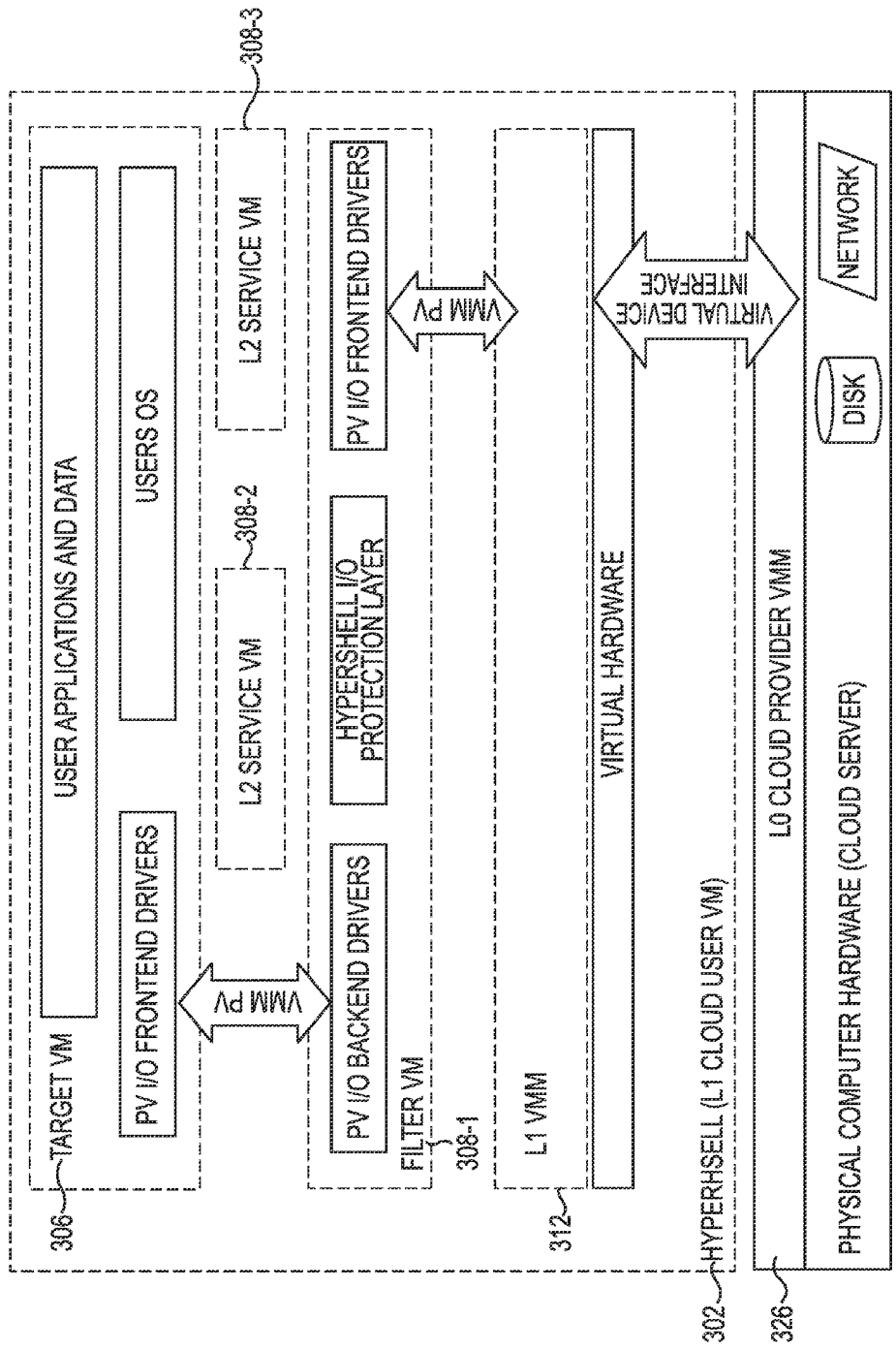
FIG. 3 illustrates a functional block diagram associated with wrapped nested virtualization in accordance with a number of embodiments of the present disclosure.

FIG. 3 illustrates a functional block diagram associated with wrapped nested virtualization in accordance with a number of embodiments of the present disclosure. FIG. 3 includes a target VM 306, a service VM 308-1, a service VM 308-2, a service VM 308-3, a L1 hypervisor 312, a HyperShell VM 302, and a L0 hypervisor 326.

In a number of examples, the L0 hypervisor 326 can be a cloud platform hypervisor that hosts a HyperShell VM 302. The HyperShell VM 302 can include the L1 hypervisor 312. The L1 hypervisor 312 can host the service VM 308-1 (e.g., referred to generally as filter VM 308-1), the service VM 308-2, the service VM 308-3, and the target VM 306. The target VM 306 can be coupled to the filter VM 308-1 via VMM paravirtualized (e.g., virtualization-aware) communication channels ("VMMPV"). Paravirtualization can define a channel of communication (e.g., I/O) between a hypervisor and a guest operating system via paravirtualized (PV) front and backend drivers. The filter VM 308-1 can be coupled to the L1 hypervisor 312 via paravirtualization.

The L0 hypervisor 326 can pass disk and/or network traffic to the target VM 306 via the L1 hypervisor 312 and the filter VM 308-1. For example, the filter VM 308-1 can intercept both disk and/or network traffic. The filter VM 308-1 can include virtual disk and network drivers (e.g., paravirtualized drivers) and a HyperShell I/O protection layer.

When data is transmitted from a target VM 306 (e.g., sent across the cloud network via the physical network interface card or stored to disk), the data can be intercepted by the filter VM 308-1, encrypted, and/or hashed before it is dispatched to the physical device driver. A HyperShell I/O protection layer within the filter VM 308-1 can encrypt and/or hash the data before it is dispatched to the physical device driver. Inbound data can be decrypted and/or verified by HyperShell I/O protection layer within the filter VM 308-1 before the data is sent to the target VM 306. This layer of protection (e.g., filter VM 308-1) can be transparent to both the underlying cloud infrastructure (e.g., L1 hypervisor 312) and the target VM 306.

A hypervisor that supports paravirtualized drivers can be well suited to support the I/O encryption capabilities. The target VM 306 running on a hypervisor can interact with a paravirtualized virtual device driver (e.g., paravirtualized frontend virtual device driver), which relays requests to a corresponding device driver (e.g., paravirtualized backend virtual device driver) responsible for managing the physical I/O device. By chaining virtual devices together it is possible to introduce an additional layer in the virtual I/O stack that transparently modifies inbound and/or outbound I/O. In a number of examples, network I/O can be filtered using the Xen and Citrix XenClient XT hypervisors, among other hypervisors. Moreover, the XenClient XT virtualization platform has been configured to support a network encryption capability using a Virtual Private Network (VPN) VM. Transparent encryption of network I/O using a single level of virtualization can be used in operational environments.

A similar capability, however, does not exist for disk I/O, whether it is for local storage (i.e., data written to a hard drive) or remote storage (i.e., cloud Network Attached Storage (NAS) or Storage Area Network (SAN)). Target VM disk I/O can be transparently intercepted by implementing a filter VM 308-1 that applies a function to all inbound and/or outbound I/O buffers. A filter VM 308-1 can provide real-time protection of disk I/O by transparently applying cryptographic operations to all storage I/O.

A filter VM 308-1 (e.g., an I/O encryption component) can, for example, ensure confidentiality and integrity of all data transmitted or stored by untrusted cloud infrastructure. In addition, the filter VM 308-1 can provide a general building block upon which to build other I/O filters, such as real-time intrusion detection, I/O mirroring, or offline analysis. Since these components are implemented as Layer 2 VMs operating in the context of a HyperShell-mediated Layer 1 VM, they can be deployed on any commodity cloud infrastructure.

What is claimed is:
1. A system comprising:
   a first Layer 0 (L0) virtual machine monitor (VMM) configured to host a first Layer 1 (L1) virtual machine (VM) and provide a first number of services, wherein the first L0 VMM is running on a processing resource of a first physical device that is part of a first cloud platform;
   a second L0 VMM that is hosted on a second physical device that is part of a second cloud platform; and
   a number of Layer 2 (L2) service VMs, a L2 migration manager VM, and a target L2 VM hosted on an L1 VMM that is hosted on the first L1 VM;
      wherein the target L2 VM is configured to execute a user application;
      wherein the number of L2 service VMs are configured to provide a second number of services to the target L2 VM;
      wherein the second number of services are different than the first number of services;
      wherein the L2 migration management VM is configured to manage a migration of the number of L2 service VMs, the L2 migration management VM, and the target L2 VM to a second Layer 1 VM running on the second L0 VMM; and
      wherein the number of L2 service VMs are configured to provide input/output (I/O) encryption capabilities, integrity monitoring, and data processing confidentiality services to the target L2 VM.
2. The system of claim 1, wherein the migration of the number of L2 service VMs, the L2 migration management VM, and the target L2 VM to the second L0 VMM is part of a moving target defense.
3. The system of claim 1, wherein the second number of services are provided without modifying the target L2 VM.
4. The system of claim 1, wherein the first L0 VMM and the second L0 VMM are different types of VMMs.
5. The system of claim 1, wherein the migration is a live migration that migrates the number of L2 service VMs, the L2 migration management VM, and the target L2 VM in real time.

* * * * *